E. WEINTRAUB.
METALLOIDAL MATERIAL.
APPLICATION FILED MAY 28, 1912.
1,074,672.
Patented Oct. 7, 1913.
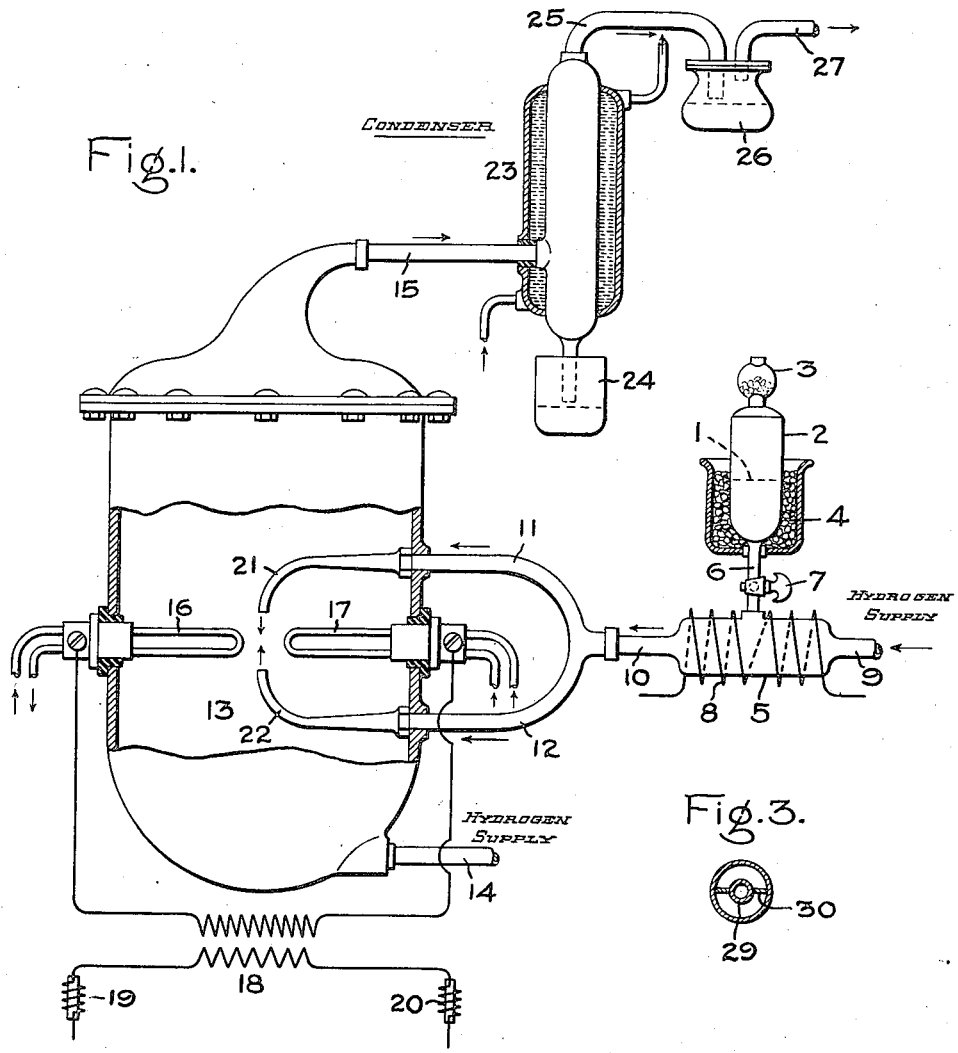
WITNESSES:
INVENTOR:
EZECHIEL WEINTRAUB,
BY Albert G. Davis
HIS ATTORNEY.

UNITED STATES PATENT OFFICE.

EZECHIEL WEINTRAUB, OF LYNN, MASSACHUSETTS, ASSIGNOR TO GENERAL ELECTRIC COMPANY, A CORPORATION OF NEW YORK.

METALLOIDAL MATERIAL.

1,074,672.  Specification of Letters Patent.  Patented Oct. 7, 1913.

Original application filed October 27, 1909, Serial No. 524,939. Divided and this application filed May 28, 1912. Serial No. 700,151.

*To all whom it may concern:*

Be it known that I, EZECHIEL WEINTRAUB, a citizen of the United States, residing at Lynn, county of Essex, State of Massachusetts, have invented certain new and useful Improvements in Metalloidal Material, (division of my former application, Serial No. 524,939, filed October 27, 1909,) of which the following is a specification.

The present invention has for its object the production of elemental boron. This material may be used for a variety of purposes in the technical arts, as described and claimed in various copending applications.

The boron produced as herein described is not the material commonly designated as boron, in the technical literature. Moissan made what he called "boron" by reduction of boric anhydrid with magnesium. He described the product as a brownish powder, practically non-conductive for electricity, and vaporizable without fusion. Prior to my own investigation of boron and its compounds, this was the material generally recognized among chemists as boron. I have, however, demonstrated that it is not pure boron at all. If the reaction is carried out as described by investigators preceding Moissan, the product is magnesium borid, containing more or less magnesium; if the reaction is carried out according to Moissan, using an excess of boric anhydrid, a boron sub-oxid is formed mixed with more or less magnesium borid.

I have found that pure boron is black, not brown, and that it can be fused into dense bodies having a conchoidal fracture, and a hardness considerably greater than sapphire. Its melting point is above 2000° C. and is not far from 2300° C. Its vapor tension is high. While it has a high electrical resistance when cold, it possesses a negative temperature coefficient of resistance of unprecedented magnitude, so that it acts as a fair conductor of electricity by the natural rise in conductivity due to the heating action of the current. I have found that at ordinary room temperatures the conductivity of pure boron doubles approximately for every 17° of temperature. In changing from room temperature to 400° C., its conductivity increases enormously, changing according to the ratio of about one to two million. At high temperature my new material combines with oxygen and is again converted into boric anhydrid.

The present application, in so far as it claims a new material described as elemental boron, is a continuation in part of my prior applications, Serial No. 316,007, filed May 9, 1906, and 346,253, filed December 4, 1906. In both these applications this material is made by the direct thermal treatment of a boron compound. In the latter application, now Patent No. 997,879, I have described the method of making boron by heating in a vacuum the impure boron compound obtainable when boric anhydrid is reduced with magnesium. This compound is mounted in an anode of a vapor arc, such as the mercury arc, to distil off foreign components and fuse the boron into a dense body. In Patent No. 1,019,392, filed October 27, 1909, I have described the preparation of boron by thermal treatment of the magnesium reduction product by a high voltage arc operating in hydrogen. In Patent No. 1,019,569, I have described and claimed the method of making boron from a mixture of boric halid and hydrogen in contact with a heated surface.

I have described in detail in my parent application, Serial No. 524,939, the production of homogeneous fused boron by the reduction of boric chlorid in an electrical arc. The description of this process is included in the present divisional application as illustrative of a method of producing pure elemental boron.

In the drawings forming part of this specification, Figure 1 is an elevation, somewhat diagrammatic, of one form of apparatus for carrying out my invention; Fig. 2 is a fragmental view of a modified form of apparatus for introducing the reaction mixture into the arc; and Fig. 3 is a detail view, being a cross-section of one of the electrodes of Fig. 2.

Boron chlorid is a colorless liquid, boiling at about room temperature. It may be prepared by passing chlorin over crude boron and redistilling the product over copper, which is quicker and more effective than the usual shaking with mercury.

As a reducing agent for the boron chlorid, I use pure, dry, hydrogen, and as a means for effecting the necessary temperature, I use an electrical arc, maintained between suitable electrodes. But in addition to this, the apparatus is so arranged that the arc blast drives the solid reduction product, namely, boron, out of the active zone and deposits it on the walls of the apparatus and on the electrodes. This is the only solid product present, the three other substances, boron chlorid, hydrogen and hydrochloric acid, being all gaseous, are allowed to pass on to an absorbing or condensing chamber. This reaction differs from any other reaction heretofore carried out in an electrical arc in having the desired reaction product in solid form, all the other substances present being gaseous. This is especially favorable, both for the removal of the desired product, which is effected by the arc blast itself, and for the production of an absolutely pure product.

In the apparatus illustrated in Fig. 1, the liquid boron chlorid 1 is contained in a glass or copper vessel 2, which is separated from the atmosphere by means of a small bulb 3 containing calcium chlorid for the absorption of moisture. The vessel 2 is surrounded by a refrigerating material, such as the ice bath 4, to prevent the vaporization of the boron chlorid. The boron chlorid is introduced into the chamber 5 by means of a tube 6 having a stop cock 7. The chamber 5 may be heated if desired in any suitable manner, as by means of an electrical coil 8. A small quantity of the liquid chlorid is introduced at intervals into the chamber 5, where it is vaporized and the vapor carried away with a stream of hydrogen entering by the tube 9. The mixture of hydrogen and boron chlorid vapor leaving the chamber 5 through an exit tube 10 passes into the two branch tubes 11 and 12, which carry the mixture into the main arc chamber 13. This chamber is made of glass or copper, or other suitable material, and is provided with an inlet tube 14 for a supply of hydrogen, and with an outlet tube 15, through which the unused hydrogen and boron chlorid, as well as the hydrochloric acid forming as a by-product of the reaction, are led to other parts of the apparatus. Within the arc chamber 13 project the electrodes 16, 17, each consisting of copper tubing doubled on itself and cooled internally by a stream of water.

For the sake of simplicity, the water supply pipes have been merely indicated in the drawing. Only one pair of electrodes is shown in the drawing, though more can be used in a single arc chamber if desired. An alternating current arc is preferably used, the current being supplied as indicated from a transformer 18, the primary of which is in circuit with suitable reactance coils 19, 20.

The mixture of hydrogen and boron chlorid is introduced directly into the hot zone of the arc by means of the nozzles 21, 22 of refractory material such as silica. The reduction of the chlorid by hydrogen is effected according to the following treatment: $BCl_3 + 3H = 3HCl + B$. The arc blast throws the solid particles of the reduced boron out of the hot zone against the walls of the arc chambers and against the electrodes themselves, and the hydrochloric acid gas is carried along with the hydrogen and any reduced boron chlorid toward the upper part of the arc chamber, where it is removed by the tube 15. The boron deposited on the electrodes themselves is fused by the heat of the arc, so that a part of the boron is yielded directly as a homogeneous fused product. The arc then runs between two boron electrodes, the boron in some cases dropping off after having grown to a certain size, and another fused deposit of boron forming on the electrode. In this connection, the choice of the electrode material is of great importance. It must have no affinity whatever for the reduction product, so as not to combine with the product depositing and melting on it; and, secondly, it must not electrically disintegrate and mix with the powdered product. I have found that in the case of boron, copper fulfils these conditions perfectly; silver and gold also act satisfactorily. If a second arc is arranged like the first and in series with it, it will act on any reduced boron chlorid passing the first arc. The mixture of gases coming from the main arc chamber 13 and consisting of hydrogen, hydrochloric acid gas and unreduced boron chlorid pass to a condenser 23, in which the boron chlorid not acted upon is again condensed to the liquid form and is caught in a suitable vessel 24. The condenser is of the usual form, and a discussion of the same in this connection is unnecessary. The mixture of hydrogen and hydrochloric acid gas passes from the condenser by means of a tube 25 to a chamber 26 containing sodium hydroxid, sodium amalgam, or other substance suitable for combining with the hydrochloric acid. The purified hydrogen passes out by a tube 27, and may be used over again.

Fig. 2 shows a modified form of apparatus in which the mixture of gases to be acted upon is introduced by means of tubes 28, 29 passing centrally through the electrodes. The electrodes proper consist of copper and are water-cooled, similar to the electrodes described in connection with Fig. 1, the circulation of cooling fluid being obtained by providing the electrodes with a central partition extending nearly to the end thereof and shown best in section, as 30 in Fig. 3. The cooling fluid passes in on one side of the partition and out on the other side.

What I claim as new, and desire to secure by Letters Patent of the United States, is:—

1. The material herein described, the same being dense, black, hard, having a high melting point, being convertible by oxidation to boric anhydrid, being electrically conductive and having a very high negative temperature resistance coefficient, its conductivity approximately doubling for 17° C. rise in temperature above room temperature.

2. The material herein described, the same being black, having a hardness greater than sapphire, a conchoidal fracture, a melting point above 2000° C., of high electrical resistance when cold, having a high negative temperature resistance coefficient, and convertible by oxidation to boric anhydrid.

3. The material derived from a compound of boron, having a hardness greater than sapphire, a high negative temperature resistance coefficient, high electrical resistance when cold, being fusible, inert chemically with respect to copper and combining directly with chlorin to form a volatile colorless liquid.

4. The material herein described derived from a compound of boron, having a melting point above 2000° C., a hardness greater than sapphire, a high resistance when cold, a high negative temperature resistance coefficient and convertible by oxidation to boric anhydrid.

5. The material herein described, the same being electrically conductive and fusible, produced by interaction of boric chlorid and hydrogen at high temperature, said material having great hardness, a conchoidal fracture, extreme purity and homogeneity.

In witness whereof, I have hereunto set my hand this 25th day of May, 1912.

EZECHIEL WEINTRAUB.

Witnesses:
    JOHN A. MCMANUS, Jr.,
    FRANK H. JOHNSON.